United States Patent
Wu et al.

(10) Patent No.: US 9,148,186 B1
(45) Date of Patent: Sep. 29, 2015

(54) HIGHLY LINEAR RECEIVER FRONT-END WITH THERMAL AND PHASE NOISE CANCELLATION

(71) Applicant: Broadcom Corporation, Irvine, CA (US)

(72) Inventors: Hao Wu, Los Angeles, CA (US); Mohyee Salahelden Mikhemar, Aliso Viejo, CA (US); David Patrick Murphy, Costa Mesa, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/262,978

(22) Filed: Apr. 28, 2014

Related U.S. Application Data

(60) Provisional application No. 61/976,948, filed on Apr. 8, 2014.

(51) Int. Cl.
  *H04L 1/00* (2006.01)
  *H04B 1/12* (2006.01)
  *H04L 25/08* (2006.01)
  *H04L 25/06* (2006.01)

(52) U.S. Cl.
  CPC .............. *H04B 1/123* (2013.10); *H04L 25/06* (2013.01); *H04L 25/08* (2013.01)

(58) Field of Classification Search
  CPC .......... H04B 1/123; H04L 25/08; H04L 25/06
  USPC .......... 375/340, 346, 347, 349; 455/295, 296, 455/307, 337, 509
  See application file for complete search history.

(56) References Cited

U.S. PATENT DOCUMENTS

| | | | | |
|---|---|---|---|---|
| 5,584,062 | A | * 12/1996 | Meador et al. | 455/260 |
| 2009/0221235 | A1 | * 9/2009 | Ciccarelli et al. | 455/62 |
| 2011/0280344 | A1 | * 11/2011 | Ye et al. | 375/327 |

* cited by examiner

*Primary Examiner* — Dhaval Patel
(74) *Attorney, Agent, or Firm* — Garlick & Markison; Bruce E. Garlick

(57) ABSTRACT

A radio receiver supporting cancellation of thermal and phase noise in a down-converted RF signal. An inbound RF signal and blocking signal are provided directly to a passive mixer for down-conversion into a first baseband signal having data, thermal noise, and reciprocal mixing (RM) noise components. The inbound signals are also provided to a transconductance circuit, the output of which is provided to a second passive mixer for conversion into a current signal having data and blocking signal components, and a RM image. The blocking signal component and the RM image are mixed with a second LO signal, derived from the blocking signal, to produce a RM noise cancellation signal. The data component of the current signal is converted into a second baseband signal having data and thermal noise components. The first baseband signal, second baseband signal and RM noise cancellation signal are then combined through harmonic recombination.

20 Claims, 6 Drawing Sheets

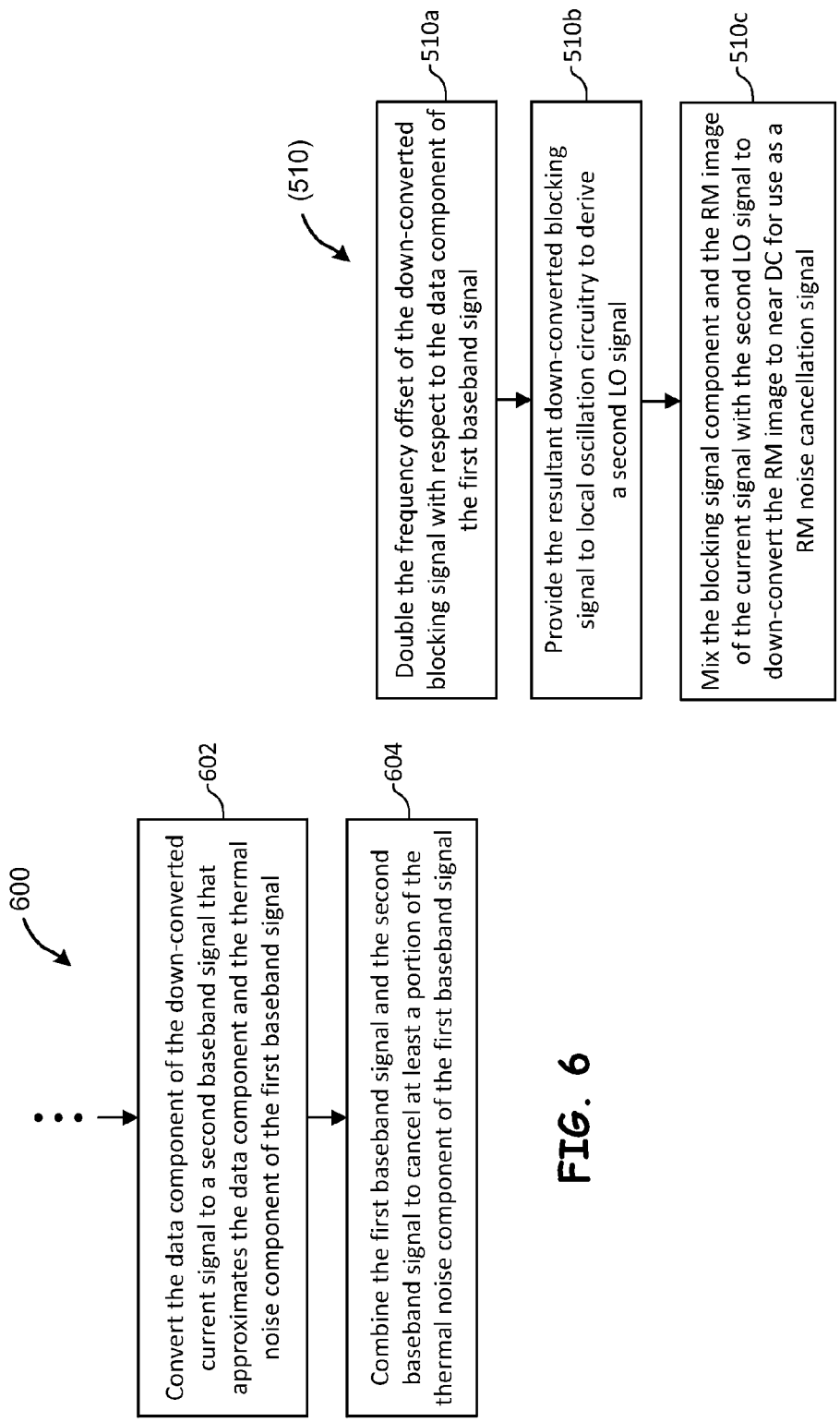

HIGHLY LINEAR RECEIVER FRONT-END WITH THERMAL AND PHASE NOISE CANCELLATION

CROSS REFERENCE TO RELATED PATENTS/PATENT APPLICATIONS

Provisional Priority Claims

The present U.S. Utility Patent Application claims priority pursuant to 35 U.S.C. §119(e) to U.S. Provisional Application No. 61/976,948, entitled "HIGHLY LINEAR RECEIVER FRONT-END WITH THERMAL AND PHASE NOISE CANCELLATION", filed Apr. 8, 2014, which is hereby incorporated herein by reference in its entirety and made part of the present U.S. Utility Patent Application for all purposes.

BACKGROUND

1. Technical Field

The present disclosure relates generally to wireless communications and, more particularly, to noise cancellation in a receiver front-end.

2. Description of Related Art

The wide adoption of wireless communication standards has created a crowded radio frequency (RF) spectrum with unprecedented levels of interference. For example, a radio receiver receiving a wanted signal must often contend with relatively large and unwanted signals on nearby frequencies (e.g., adjacent channels). These signals are often referred to as "blocking signals" or "blockers", and are known to cause issues such as gain compression in a receiver. Interference problems may be exacerbated when multiple radios are integrated in a single device, leading to "coexistence" blockers.

In addition, during down-conversion in a receiver, reciprocal mixing of the phase noise of a local oscillator (LO) with an unwanted blocker may deposit additive noise, proportional to the blocker amplitude, on top of a desired signal. Receiver desensitization due to reciprocal mixing can be mitigated, in some instances, by filtering unwanted blocking signals prior to down-conversion using fixed radio frequency (RF) band-pass filters placed immediately after the antenna. Such filters are expensive, require discrete filtering components, and, generally, are undesirable in certain applications, such as true Software-Defined-Radios (SDRs) that require wide bandwidth operation.

The undesirable effects of reciprocal mixing may also be mitigated by implementing local oscillators that have relatively minimal phase noise, such as LC-oscillators utilizing integrated resonators. However, the phase noise improvement provided by an LC-oscillator comes at the expense of increased power dissipation, the requirement of an integrated inductor, and other design trade-offs.

BRIEF DESCRIPTION OF THE SEVERAL VIEWS OF THE DRAWINGS

FIG. 6 is an operational flow diagram illustrating an exemplary method for further providing thermal noise cancellation in the method of FIG. 5.

FIG. 7 is an operational flow diagram illustrating further exemplary details for cancelling reciprocal mixing caused by phase noise in accordance with the method of FIG. 5.

DETAILED DESCRIPTION

The embodiments described below may be practiced in a variety of communication networks that utilize wireless technology for communications between a transmission source or sources and a receiving device utilizing one or more communication protocols to transfer voice, video, data and/or other types of information. The particular technology described below pertains generally to LTE/LTE-Advanced communication standards and other cellular communication standards as applied to mobile devices such as smartphones. However, the disclosed technology is not limited to use with a particular standard and other wireless communication standards and protocols may be applicable for use with the described embodiments and/or other embodiments.

Figure 1:
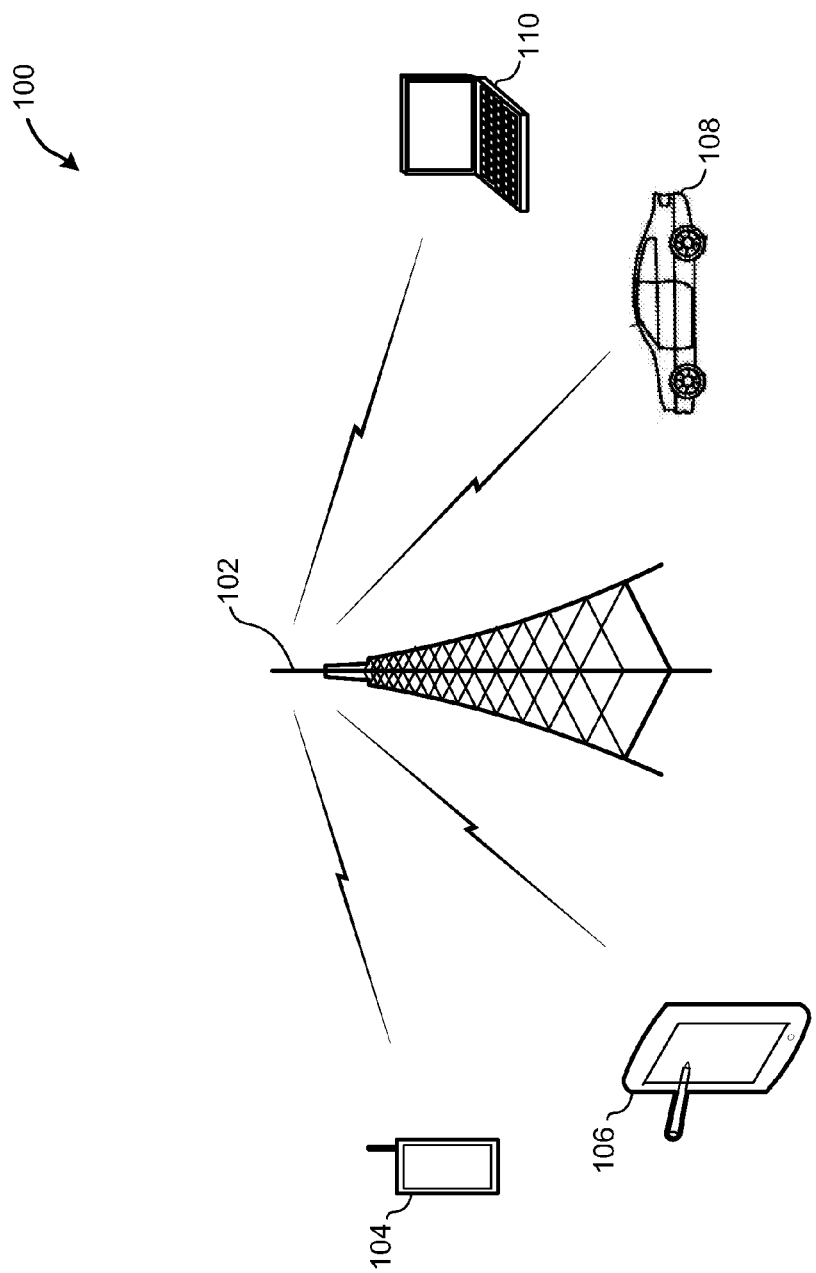
FIG. 1 is a system diagram illustrating an example wireless communication network connecting a number of different mobile devices to a transmitting/receiving node that transmits and receives RF signals.

FIG. 1 is a system diagram illustrating an example wireless communication network connecting a number of different mobile devices to a transmitting/receiving node that transmits and receives RF signals. In FIG. 1, a system 100 is shown that includes a variety of mobile devices 104-110 configured to operate within a network having a transmitting/receiving node 102. In the example system 100, transmitting/receiving node 102 is a cellular communication node, commonly referred to as a base station or Node B. Other embodiments may employ different communication technology from different wireless transmitting sources. Further, instead of a single transmitting/receiving node 102, multiple such nodes may be present.

In the exemplary system 100, device 104 is a mobile phone (e.g., cell phone, smartphone, etc.), device 106 is a tablet computer with cellular capabilities, device 108 is a device affixed in a vehicle (e.g., a communication device or GPS navigation system with dual communication link), and device 110 is a notebook computer or a personal computer (PC) with wireless capabilities. Other types of wireless devices may be present within system 100, and in some instances such devices may incorporate two or more radios (e.g., one radio covering various cellular modes and another radio for WiFi communications). Further, mobile devices 104-110 may utilize Software-Defined-Radios (SDRs) in which certain radio components that are typically implemented in hardware are instead implemented by means of software.

Devices 104-110, which are sometimes referred to as User Equipment (UE) in a cellular network, communicate with transmitting/receiving node 102 utilizing one or more communication protocols and/or standards. As noted above, the network of system 100 may use LTE or 4G communication standards/protocols to transmit voice, audio, video, data, etc. from transmitting/receiving node 102 to radio receivers incorporated in or coupled to devices 104-110, and vice versa. In addition, transmitted carrier signals may carry multiple component carrier signals that are aggregated and directed to a receiving device.

Carrier signals involve a carrier frequency that typically represents a center frequency of a radio frequency (RF) channel. Depending on the network and/or the geographic location of a given network, the various RF frequency bands and carrier frequency allocations may differ. In some networks, the network frequency allocation allows for two or more carrier signals to be in the same range of frequencies allocated as a particular frequency band so that the multiple component carriers reside within the same allocated band (intra-band), whereas in other applications, one or more carrier signals reside in different allocated frequency bands (inter-band). In addition to the presence of multiple transmitting sources (including, in some devices, the presence of multiple radios within a single device), such frequency band and carrier frequency allocations may impose stringent requirements on the capacity of a receiver to tolerate large blocking signals in nearby channels or frequencies.

Figure 2:
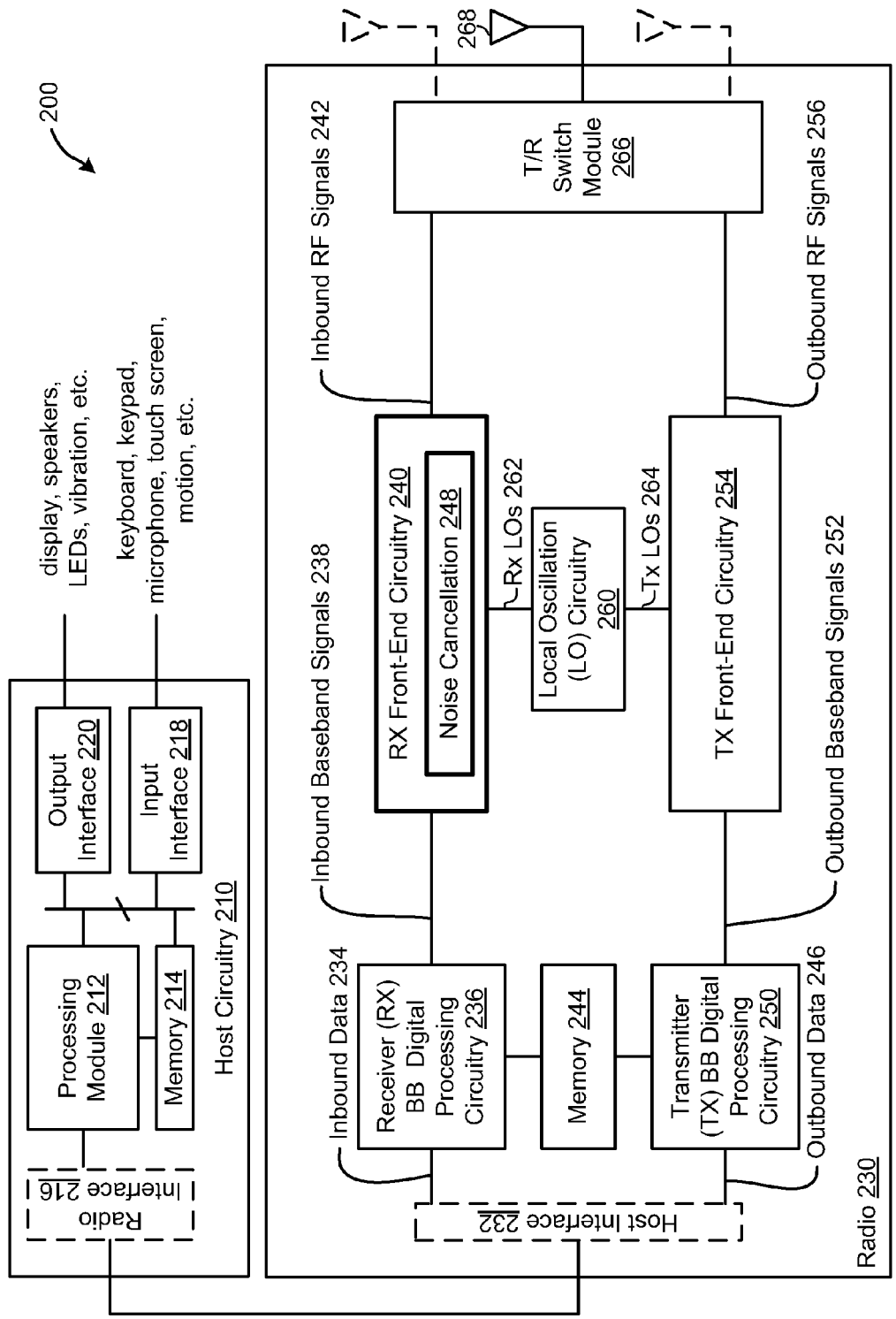
FIG. 2 is a functional block diagram illustrating an exemplary embodiment of a wireless communication device incorporating receiver circuitry with thermal and phase noise cancellation.

FIG. 2 is a functional block diagram illustrating an exemplary embodiment 200 of a wireless communication device (such as a wireless communication device 104-110 of FIG. 1) incorporating receiver circuitry with thermal and phase noise cancellation. In the illustrated embodiment, a radio 230 is operably coupled to host circuitry 210 of the wireless communication device 200. For smartphones and like devices, the radio 230 is typically a built-in component. For tablet computing devices, laptops, personal computers and/or other wireless communication devices, the radio 230 may be built-in or an externally coupled component. In some instances, the structures and components described below are illustrated in block diagram form in order to avoid obscuring the concepts of the subject technology. Further, as used herein, the term "front-end" refers in general to the circuitry between an antenna and the baseband (or "BB") signal digital processing circuitry.

As illustrated, the wireless communication device 200 includes a processing module 212, memory 214, a radio interface 216, an input interface 218, and an output interface 220. The processing module 212 and memory 214 are configured to execute instructions that enable functionality of the wireless device. For example, for a smartphone the processing module 212 may perform communication functions in accordance with a particular cellular standard, multimedia processing functions, etc.

The radio interface 216 allows data to be received from and sent to the radio 230. For data received from the radio 230 (e.g., inbound data), the radio interface 216 provides the data to the processing module 212 for further processing and/or routing to the output interface 220. The output interface 220 provides connectivity to an output display device such as a display, monitor, speakers, LEDs, etc., such that the received data may be displayed or otherwise utilized. The radio interface 216 also provides data from the processing module 212 to the radio 230. The processing module 212 may receive the outbound data from an input device such as a keyboard, keypad, microphone, biometric sensor, touch screen, etc., via the input interface 218, or generate the data itself. For data received via the input interface 218, the processing module 212 may perform a corresponding host function on the data and/or route it to the radio 230 via the radio interface 216.

Radio 230 includes a host interface 232 (in embodiments where separate integrated circuit devices are utilized), receiver (RX) BB digital processing circuitry 236, RX front-end circuitry 240 including noise cancellation circuitry 248 (various exemplary embodiments of which are described more fully below with reference to FIGS. 3-7), local oscillation (LO) circuitry 260 (which may be implemented, at least in part, using one or more voltage controlled oscillator (VCOs), memory 244, transmitter (TX) BB digital processing circuitry 250, TX front-end circuitry 254, and an antenna 268. The antenna 268 may be a single antenna or antenna array that is shared by the transmit path and receive path as regulated by a T/R switch module 266. A given antenna implementation will generally depend on the particular standard or standards to which the wireless communication device is compliant.

The RX BB digital processing circuitry 236 and the TX BB digital processing circuitry 250, in combination with operational instructions stored in memory 244, execute digital receiver functions and digital transmitter functions, respectively. The digital receiver functions may include, but are not limited to, digital intermediate frequency to baseband conversion, demodulation, constellation demapping, decoding, and/or descrambling. The digital transmitter functions may include, but are not limited to, scrambling, encoding, constellation mapping, modulation, carrier aggregation control signal generation, and/or digital baseband to IF conversion. The BB digital processing circuitry 236 and 250 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog and digital circuitry, and/or any device that manipulates signals (analog and/or digital) based on operational instructions. The memory 244 may be a single memory device or a plurality of memory devices. Such a memory device may be a read-only memory, random access memory, volatile memory, non-volatile memory, static memory, dynamic memory, flash memory, and/or any device that stores digital information. Note that when the digital processing circuitry 236 and/or 250 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 230 receives outbound data 246 from the host circuitry 210 via the host interface 232. The host interface 232 routes the outbound data 246 to the TX BB digital processing circuitry 250, which processes the outbound data 246 in accordance with a particular wireless communication standard to produce outbound baseband signals 252. The outbound baseband signals 252 will be digital baseband signals (e.g., have a zero IF) or digital low IF signals, where the low IF typically will generally be in the frequency range of one hundred kHz (kilo-Hertz) to a few MHz (Mega-Hertz).

The TX front-end circuitry 254 performs a number of functions, including converting the outbound baseband signals 252 from the digital domain to the analog domain and filtering and/or adjusting the gain of the analog signals prior to providing the signals to an IF mixing up conversion module that converts the analog baseband or low IF signals into RF signals based on a transmitter local oscillation (TX LO) signal 264 provided by local oscillation circuitry 260. A power amplifier (PA) (not separately illustrated) amplifies the RF signals to produce outbound RF signals 256 (which may be filtered by TX filter module), and the antenna 268 transmits the outbound RF signals 256 to a targeted device such as a base station, an access point and/or another wireless communication device(s). Multiple RF signal paths may be provided to perform carrier aggregation-based transmissions.

The radio 230 also receives, via the antenna 268, inbound RF signals 242 which were transmitted by a base station, an access point, or another wireless communication device. The antenna 268 provides the inbound RF signals 242, via the T/R switch module 266, to the RX front-end circuitry 240. In the illustrated embodiment, and as described more fully below, traditional RX filtering and low noise amplifier (LNA) circuitry in the inbound RF signal path is omitted. The RX front-end circuitry 240 performs a number of functions, including converting the inbound RF signals 242 into inbound low IF signals or baseband signals based on a receiver local oscillation (Rx LO) signal 262 provided by local oscillation circuitry 260. Filtering of the inbound signals may or may not be performed depending on the particular implementation. The inbound signals are then converted from the analog domain to the digital domain to produce inbound baseband signals 238, where the inbound baseband signals 238 will be digital baseband signals or digital low IF signals, and where the low IF typically will be in the frequency range of one hundred kHz to a few MHz. The RX BB digital processing circuitry 236 decodes, descrambles, demaps, and/or demodulates the inbound baseband signals 238 to produce inbound data 234 in accordance with the particular wireless communication standard(s) being implemented by radio 230. The host interface 232 provides the inbound data 234 to the host circuitry 210 via the radio interface 216.

The wireless communication device of the embodiment 200 of FIG. 2 may be implemented using one or more integrated circuits or RF integrated circuits (RF ICs). For example, the host circuitry 210 may be implemented on one integrated circuit, the RX BB digital processing circuitry 236, the TX BB digital processing circuitry 250 and memory 244 may be implemented on a second integrated circuit, and the remaining components of the radio 230 (including antenna 268 in some embodiments), may be implemented on a third integrated circuit. As an alternate example, the radio 230 may be implemented on a single RF IC. As yet another example, the processing module 212 of the host circuitry 210 and the BB digital processing circuitry 236 and 250 may be a common processing device implemented on a single integrated circuit. Further, memory 214 and memory 244 may be implemented on a single integrated circuit and/or on the same integrated circuit as processing module 212 and the BB digital processing circuitry 236 and 250, respectively.

Figure 3:
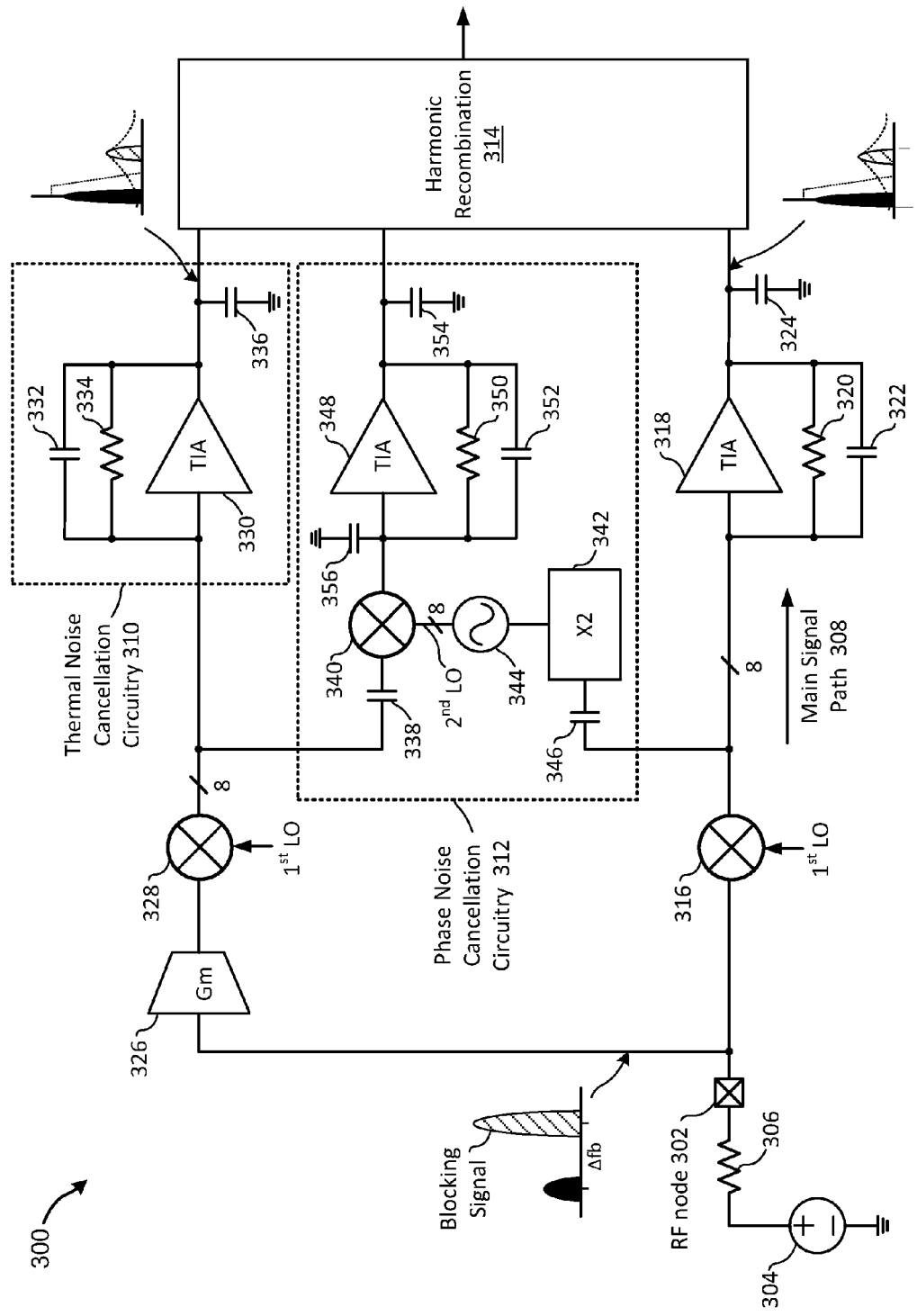
FIG. 3 is a circuit diagram illustrating exemplary receiver circuitry to support thermal and phase noise cancellation.

FIG. 3 is a circuit diagram illustrating exemplary receiver circuitry 300 to support thermal and phase noise cancellation. The receiver circuitry 300 may be included, for example, in the RX front-end circuitry 240 and noise cancellation circuitry 248 of FIG. 2.

Briefly, in the illustrated embodiment, an inbound RF signal and blocking signal are provided directly to a passive mixer for down-conversion into a first baseband signal having data, thermal noise, and reciprocal mixing (RM) noise components. The inbound signals are also provided to a transconductance circuit, the output of which is provided to a second passive mixer for conversion into a current signal having data and blocking signal components, and a RM image near a frequency offset 2Δfb from the data component. The blocking signal component and the RM image are mixed with a second LO signal, derived from the blocking signal, to produce a RM noise cancellation signal. The data component of the current signal is converted into a second baseband signal having data and thermal noise components. The first baseband signal, second baseband signal and RM noise cancellation signal are then combined through harmonic recombination to remove noise from the first baseband signal before it is provided to baseband circuitry for further processing. Such noise cancellation techniques provide substantial reduction in RM noise in a manner that is relatively independent of the LO phase noise.

Referring more particularly to FIG. 3, the receiver circuitry 300 includes a mixer-first main signal path 308, thermal noise cancellation circuitry 310 and phase noise cancellation circuitry 312. The mixer-first architecture of the main signal path 308 provides for high linearity and wideband matching as compared to traditional architectures that employ passive RX filtering components and LNAs, and can tolerate relatively large blocking signals. The receiver circuitry 300 may be particularly useful in applications such as SDRs in which no external RF filtering is available, and in applications where it may be desirable to avoid integrated inductors or reduce the typical power requirements of an LC oscillator.

In the illustrated embodiment, an exemplary inbound RF signal is received at an RF node 302 via an antenna (as represented by voltage source 304 and resistance 306). The inbound RF signal includes a modulated RF signal and a blocking signal at a frequency offset of Δfb from the modulated RF signal. A first passive mixer 316, in the main signal path 308, is configured to receive and mix the RF signal (including the blocking signal) and a first local oscillation (LO) signal to produce a down-converted RF signal. In certain embodiments, this passive mixer 316 is a highly linear 8-phase mixer.

The first LO may be provided by a voltage controlled oscillator (VCO) (not separately illustrated) having phase noise. In general, phase noise can be viewed as random deviations or disturbances in the frequency of oscillation. As noted, such phase noise may result in unwanted RM images from both blocking signals and other noise sources, including thermal noise due, for example, to resistive elements. As used herein, the term "thermal noise" may also include other types of noise (e.g., flicker noise) that contributes to the relevant noise floor (NF) of the receiver circuitry 300.

A first amplifier circuit (shown as a transimpedance amplifier (TIA) 318) receives the down-converted RF signal and converts it to a first baseband signal having a data component, a thermal noise component, and a reciprocal mixing (RM) noise component that is a product of reciprocal mixing of the blocking signal. The TIA 318 (e.g., an inverter circuit) is configured with a feedback resistor 320 and capacitor 322 coupled in parallel between its input and output. A capacitor 324 is coupled between the output of the TIA 318 and ground. The first baseband signal (at the output of TIA 318) is provided to harmonic recombination circuitry 314, which performs noise cancellation operations as discussed more fully below.

A transconductance (or Gm) circuit 326 is also coupled to the RF node to receive the inbound RF signal and convert it to a corresponding current signal. This current signal is then provided to a second passive mixer 328 configured to mix the current signal with the first LO signal to produce a down-converted current signal having a data component near DC, a blocking signal component near a frequency offset Δfb from the data component, and a RM image near a frequency offset 2Δfb from the data component. In general, a low impedance at the input of the passive mixer 328 is provided to suppress the signal swing at the output of the transconductance circuit 326. In the illustrated embodiments, the thermal noise cancellation circuitry 310 and the phase noise cancellation circuitry 312 share the same transconductance circuit 326 and passive mixer 328, and the down-converted current signal is utilized in both.

In accordance with the illustrated embodiments, the thermal noise cancellation circuitry 310 is configured to convert the data component of the down-converted current signal to a second baseband signal that approximates the data component and the thermal noise component of the first baseband signal. This conversion is performed by a TIA 330 (e.g., an inverter circuit) having a feedback resistor 334 and capacitor 332 coupled in parallel between its input and output. A capacitor 336 is coupled between the output of the TIA 330 and ground. The output of the TIA 330 (second baseband signal) is provided to harmonic recombination circuitry 314 for use in cancelling at least a portion of the thermal noise component of the first baseband signal.

In general, the thermal noise cancellation circuitry 310 cancels the noise from the main signal path 308 by providing a measurement of the noise voltage at RF node 302. In various embodiments, the thermal noise cancellation circuitry 310 presents a low-pass impedance to the (current-mode) passive mixer 328, such that only the desired data component of the down-converted current signal is admitted to the TIA 330. In such embodiments, a low-frequency pole at the output of the TIA 330 results in a zero in its input impedance.

The phase noise cancellation circuitry 312 is configured to mix the blocking signal component and the RM image of the down-converted current signal with a second LO signal to produce a RM noise cancellation signal used to cancel in-band RM noise. In particular, the phase noise cancellation circuitry 312 presents a high-pass impedance to the passive mixer 328, such that only the blocking signal component and the RM image of the down-converted current signal are admitted. This high-pass response is realized by a series capacitor 338 coupled between the output of the passive mixer 328 and an input of a third passive mixer 340 (e.g., an 8-phase passive mixer). The passive mixer 340 operates to mix the blocking signal component and the RM image of the down-converted current signal with the second LO signal to down-convert the RM image, and may also up-convert the baseband input impedance of the phase noise cancellation circuitry 312 by 2Δfb.

As discussed more fully below in conjunction with FIG. 4, a capacitor 346 is coupled on one end to the output of the first passive mixer to pass the down-converted blocking signal component of the down-converted RF signal. A frequency doubling circuit 342 coupled to the second end of the capacitor 346, and operates to shift the frequency offset of the down-converted blocking signal from Δfb to 2Δfb. An oscillator 344 is coupled to the frequency doubling circuit 342 and configured to produce the second LO signal as derived from the shifted down-converted blocking signal.

The output of the passive mixer 340 is provided to a TIA 348 for conversion into a RM noise cancellation signal (comprised of the RM image down-converted to near DC). A feedback resistor 350 and capacitor 352 are coupled in parallel between the input and output and output of the TIA 348, and a capacitor 354 is coupled between the output of the TIA 348 and ground. A shunt capacitor 356 is provided at the input of TIA 348 to filter current due to the blocking signal component of the down-converted current signal.

In certain embodiments, the high-pass capacitor is of sufficiently high value that the input impedance of the phase noise cancellation circuitry 312 is low at Δfb, but not of too high a value to cut into the bandwidth of the TIA 330. At the RM image frequency (2Δfb), the out-of-band input impedance of the thermal noise cancellation circuitry 310 is higher (>1 kΩ) than the up-converted in-band input impedance (~100Ω) of the TIA 348, such that noise from the TIA 348 contributes negligibly after phase noise cancellation.

In the illustrated embodiment, the harmonic recombination circuitry 314 is further configured to combine the first baseband signal and the RM noise cancellation signal to cancel at least a portion of the RM noise component of the first baseband signal. The output(s) of the harmonic recombination circuitry 314 are provided to baseband digital processing circuitry for further signal processing such as described above.

Figure 4:
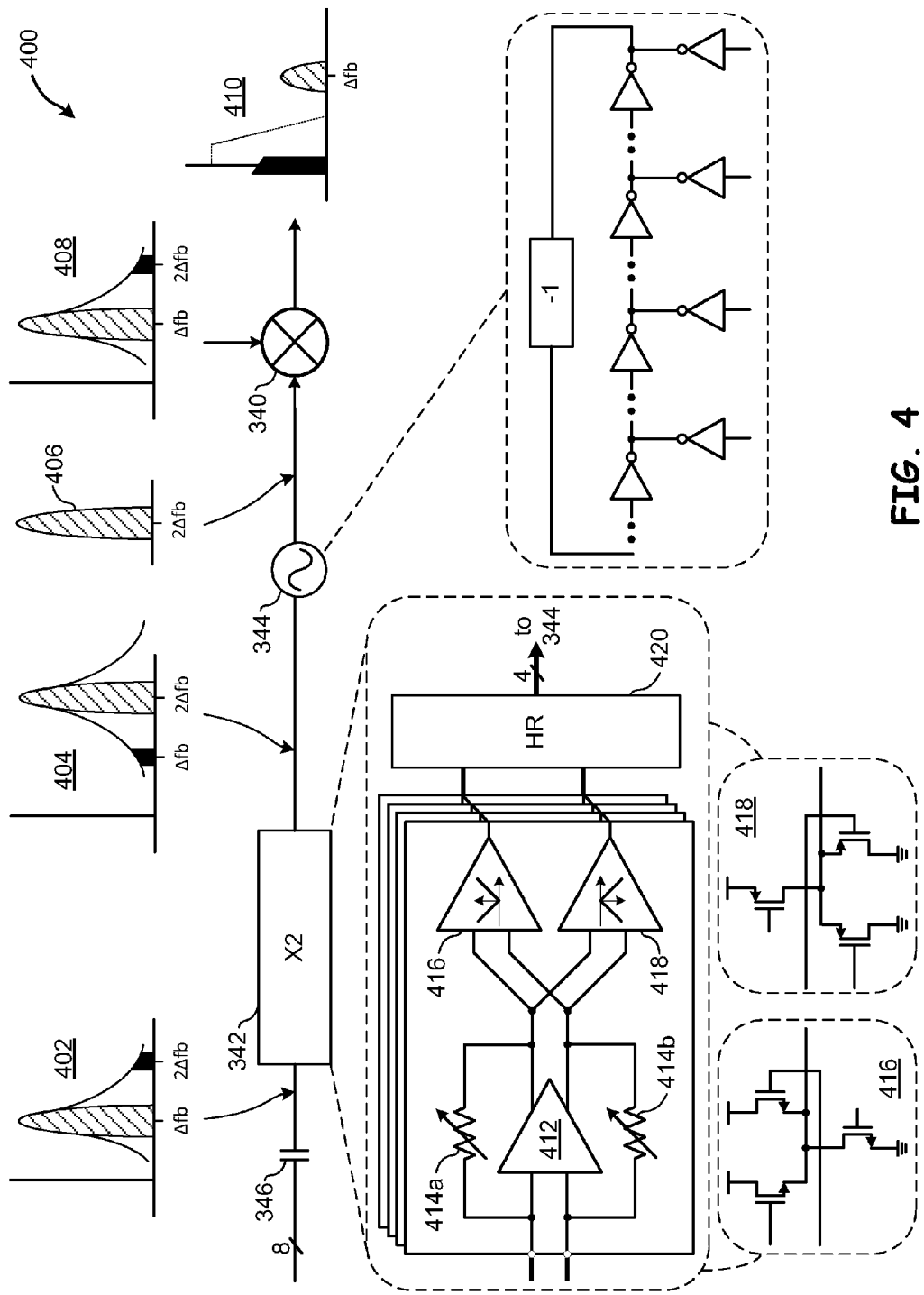
FIG. 4 is a circuit diagram illustrating further details of exemplary receiver circuitry to support thermal and phase noise cancellation.

FIG. 4 is a circuit diagram illustrating further details of exemplary receiver circuitry 400 to support thermal and phase noise cancellation. In the illustrated embodiment, the frequency doubling circuit 342 is implemented by a TIA 412 with variable feedback resistors 414a and 414b coupled to rectifying elements 416 and 418 (which operate to provide square wave outputs for use by the oscillator 344). The eight-phase outputs of these elements are converted, by harmonic recombination circuitry 420, into 4-phase signals used to drive the oscillator 344. It is noted that the illustrated amplifier 412 and associated elements utilize complex (I/Q) signal paths. Such complex signal paths/elements may be utilized throughout the embodiments of FIGS. 3 and 4, but have been omitted elsewhere for sake of clarity. As illustrated, the oscillator 344 of this embodiment may be an injection-locked ring oscillator (ILRO) that locks to the frequency and phase of the outputs of the frequency doubling circuit 342.

In this embodiment, the frequency doubling circuit 342 receives the down-converted blocking signal component of the down-converted RF signal, residing near Δfb, and a RM image near a frequency offset 2Δfb (402) for use in deriving the second LO signal used to generate the RM noise cancellation signal. After frequency doubling, the blocking signal component is shifted to 2Δfb (404) for use by oscillator 344 to produce the second LO signal, also centered at 2Δfb (406). To perfectly cancel the RM noise caused by phase noise in the first passive mixer, the ideal LO to drive the third passive mixer (for down-conversion of the RM image at 2Δfb illustrated in 408) is $V_{LO2}=\cos(2\Delta\omega_b t+2\theta_b(t)-2\theta_{LO})$. The phase offset of the second LO signal is a constant, which can be easily compensated for via harmonic recombination after the RM image is down-converted.

Since 4-phase signals are produced by the frequency doubling circuit 342, 3rd order non-linearities can be removed. As illustrated (402), along with the blocking signal component around Δfb, the capacitor 346 also admits the RM image around 2Δfb. Due to strong second order nonlinearity in the frequency doubling circuit 342, this RM image and any noise around DC (e.g., flicker noise) from the TIA 412 will be shifted to Δfb, and reciprocally mixes with the blocker current through the mixer 340. The oscillator 344 may be used to filter this shifted RM image and flicker noise from the TIA 412 at Δfb.

The 8-phase operation of the illustrated embodiment cancels the folding of reciprocal mixing "skirts" at the second passive mixer's 3rd and 5th harmonic. Assuming phase noise generated by reciprocal mixing is perfectly canceled by the phase noise cancellation circuitry 312, the phase noise of oscillator 344 at Δfb offset will dominate the noise floor of the receiver, as it also reciprocally mixes with the blocking signal component current through the passive mixer 340. However, as the oscillator 344 generally runs at a relatively low frequency, its performance requirements are greatly relaxed.

Thus, receiver circuitry 400 makes use of the symmetry of phase noise around the carrier signal by using an image of the reciprocal mixing noise at double the blocker beat frequency to generate a RM noise cancellation signal (410) to cancel noise in the receive-band.

Although the illustrated receiver circuitry 400 employs a ring oscillator architecture for oscillator 344, it is noted that an injection-locked LC-oscillator may instead be utilized, such as in applications wherein relatively higher power dissipation is acceptable and reliable inductor values can be fabricated without Q-degradation. While ring oscillators are generally more susceptible to power supply variations than LC-oscillators, which translates into higher phase noise and jitter, LC-oscillators may occupy a relatively larger area of an integrated circuit die, as such oscillators are typically constructed of on-chip inductors and tunable capacitors. Other topology variations may be implemented without departing from the spirit of the disclosure.

Figure 5:
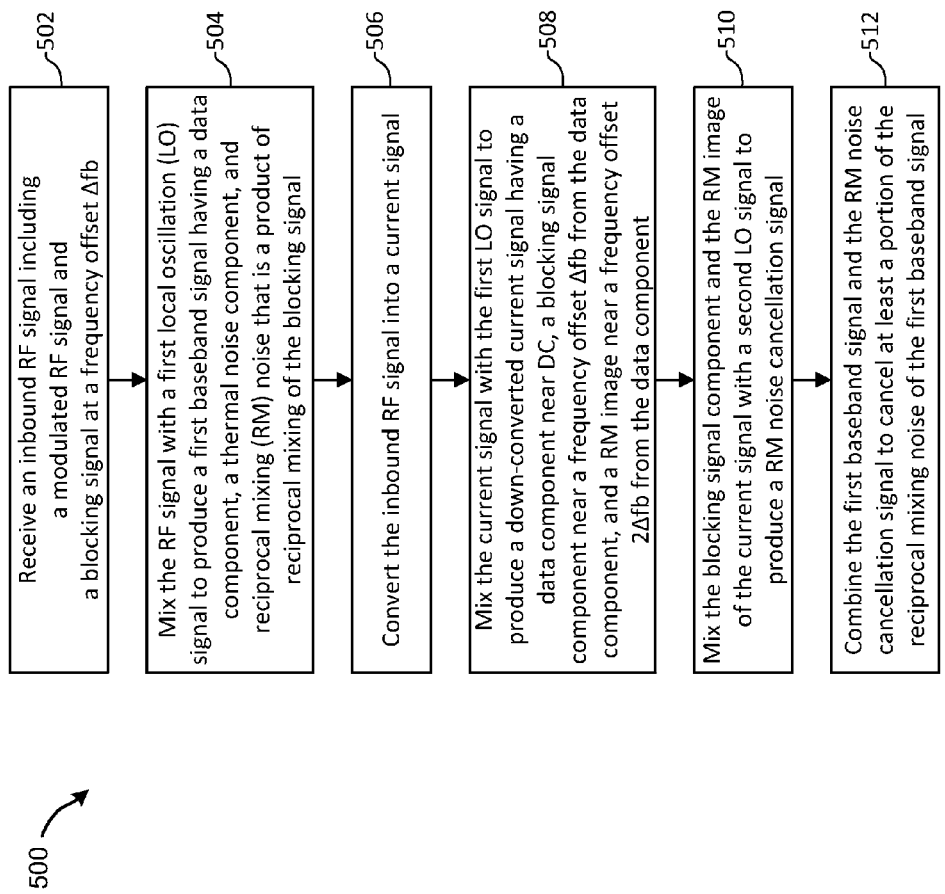
FIG. 5 is an operational flow diagram illustrating an exemplary method for cancelling reciprocal mixing caused by phase noise in an oscillator.

FIG. 5 is an operational flow diagram illustrating an exemplary method 500 for cancelling reciprocal mixing caused by phase noise in an oscillator. Following reception of an inbound RF signal including a modulated RF signal and a blocking signal at a frequency offset Δfb (502), the RF signal is mixed with a first LO signal to produce a first baseband signal having a data component, a thermal noise component, and reciprocal mixing noise that is a product of reciprocal mixing of the blocking signal (504). Next, the inbound RF signal is converted (e.g., via a transconductance amplifier) into a current signal (506). This current signal is mixed with the first LO signal to produce a down-converted current signal having a data component near DC, a blocking signal component near a frequency offset Mb from the data component, and a RM image near a frequency offset 2Δfb from the data component (508).

The blocking signal component of the down-converted current signal (in the main RF signal path) and the RM image of the current signal are then mixed with a second LO signal to produce a RM noise cancellation signal (510). This RM noise cancellation signal is then combined (e.g., through harmonic recombination) with the first baseband signal in a manner that removes or cancels substantially all or a portion of the reciprocal mixing noise present in the first baseband signal (512).

FIG. 6 is an operational flow diagram illustrating an exemplary method 600 for further providing thermal noise cancellation in the method of FIG. 5. The illustrated method operates to cancel thermal noise that is typically present at the RF node receiving the inbound signal and propagated through the main RF signal path. The method first converts the data component of the down-converted current signal (see 508) to a second baseband signal that approximates the data component and the thermal noise component of the first baseband signal (602). Next, the first baseband signal and the second baseband signal are combined to cancel at least a portion of the thermal noise component of the first baseband signal (604). As with the RM noise cancellation signal, the first baseband signal may be combined with the second baseband signal through appropriately configured harmonic recombination.

FIG. 7 is an operational flow diagram illustrating further exemplary details for cancelling reciprocal mixing caused by phase noise in accordance with the method of FIG. 5. In this embodiment, mixing of the blocking signal component of the down-converted current signal and the RM image is performed by first doubling the frequency offset of the down-converted blocking signal with respect to the data component of the first baseband signal (510a). Next, the resultant down-converted blocking signal is provided to local oscillation circuitry, such as an injection locked ring oscillator, to derive a second LO signal (510b). The RM noise cancellation signal is then produced by mixing this second LO signal with the blocking signal component and the RM image of the current signal to down-convert the RM image to near DC (510c) for use in RM noise cancellation.

As may be used herein, the terms "near", "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processing circuitry", "processor" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, processing circuit, and/or processing unit may be, or further include, memory and/or an integrated memory element, which may be a single memory device, a plurality of memory devices, and/or embedded circuitry of another processing module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, processing circuit, and/or processing unit executes, hard coded and/or operational instructions corresponding to at least some of the steps and/or functions illustrated in one or more of the figures (FIGs). Such a memory device or memory element can be included in an article of manufacture.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed subject matter. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the claimed subject matter. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contrary, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A wireless communication device comprising:
   main signal path circuitry configured to receive a radio frequency (RF) signal at an RF node, the RF signal including a modulated RF signal and a blocking signal at a frequency offset $\Delta fb$, the main signal path circuitry including:
      a first passive mixer configured to mix the RF signal and a first local oscillation (LO) signal to produce a down-converted RF signal; and
      a first amplifier circuit configured to convert the down-converted RF signal to a first baseband signal having a data component, a thermal noise component, and a reciprocal mixing (RM) noise component that is a product of reciprocal mixing of the blocking signal;
   a transconductance circuit coupled to the RF node and configured to convert the RF signal to a current signal;
   a second passive mixer configured to mix the current signal with the first LO signal to produce a down-converted current signal having a data component near DC, the down-converted current signal further having a blocking signal component near a frequency offset $\Delta fb$ from the data component, and a RM image near a frequency offset $2\Delta fb$ from the data component;
   phase noise cancellation circuitry configured to mix the blocking signal component and the RM image of the down-converted current signal with a second LO signal to produce a RM noise cancellation signal; and
   harmonic recombination circuitry configured to combine the first baseband signal and the RM noise cancellation signal to cancel at least a portion of the RM noise component of the first baseband signal.

2. The wireless communication device of claim 1, further comprising:
   thermal noise cancellation circuitry configured to convert the data component of the down-converted current signal to a second baseband signal that approximates the data component and the thermal noise component of the first baseband signal,
   the harmonic recombination circuitry further configured to combine the first baseband signal and the second baseband signal to cancel at least a portion of the thermal noise component of the first baseband signal.

3. The wireless communication device of claim 1, wherein the RM noise cancellation signal comprises the RM image down-converted to near DC.

4. The wireless communication device of claim 1, the down-converted RF signal including a down-converted blocking signal component, wherein the second LO signal is derived from the down-converted blocking signal component.

5. The wireless communication device of claim 4, wherein the phase noise cancellation circuitry comprises:
   a third passive mixer configured to mix the blocking signal component and the RM image of the down-converted current signal with the second LO signal;
   a capacitor coupled on one end to the output of the first passive mixer to pass the down-converted blocking signal component of the down-converted RF signal;
   a frequency doubling circuit coupled to a second end of the capacitor, the frequency doubling circuit configured to shift the frequency offset of the down-converted blocking signal from Δfb to 2Δfb to produce a shifted down-converted blocking signal; and an oscillator coupled to the frequency doubling circuit and configured to produce the second LO signal based on the shifted down-converted blocking signal.

6. The wireless communication device of claim 5, wherein the oscillator comprises an injection locked ring oscillator.

7. The wireless communication device of claim 5, wherein the oscillator comprises an LC-oscillator.

8. The wireless communication device of claim 5, wherein the third passive mixer is an eight-phase mixer.

9. A method for operating a wireless communication device comprising:

receiving an inbound RF signal including a modulated RF signal and a blocking signal at a frequency offset Δfb;

mixing the RF signal with a first local oscillation (LO) signal to produce a first baseband signal having a data component and reciprocal mixing (RM) noise that is a product of reciprocal mixing of the blocking signal;

converting the inbound RF signal into a current signal;

mixing the current signal with the first LO signal to produce a down-converted current signal having a data component near DC, a blocking signal component near a frequency offset Δfb from the data component, and a RM image near a frequency offset 2Δfb from the data component;

mixing the blocking signal component and the RM image of the current signal with a second LO signal to produce a RM noise cancellation signal; and combining the first baseband signal and the RM noise cancellation signal to cancel at least a portion of the reciprocal mixing noise of the first baseband signal.

10. The method of claim 9, the first baseband signal having a thermal noise component, further comprising:

converting the data component of the down-converted current signal to a second baseband signal that approximates the data component and the thermal noise component of the first baseband signal; and combining the first baseband signal and the second baseband signal to cancel at least a portion of the thermal noise component of the first baseband signal.

11. The method of claim 9, wherein the RM noise cancellation signal comprises a down-converted RM image.

12. The method of claim 11, wherein mixing the blocking signal component and the RM image of the current signal path with a second LO signal to produce a RM noise cancellation signal includes down-converting the RM image near DC.

13. The method of claim 12, wherein mixing the RF signal with a first LO signal further produces a down-converted blocking signal, further comprising:

deriving the second LO signal from the down-converted blocking signal.

14. The method of claim 13, wherein deriving the second LO signal from the down-converted blocking signal comprises:

doubling the frequency offset of the down-converted blocking signal with respect to the data component of the first baseband signal; and providing the resultant down-converted blocking signal to local oscillation circuitry.

15. The method of claim 14, wherein the local oscillation circuitry comprises a ring oscillator.

16. The method of claim 14, wherein the local oscillation circuitry comprises an LC-oscillator.

17. A radio frequency integrated circuit (RF IC) comprising:

main signal path circuitry configured to receive and down-convert a radio frequency signal at an RF node, the RF signal including a modulated RF signal and a blocking signal at a frequency offset Δfb, including:

a first passive mixer configured to mix the RF signal and a first local oscillation (LO) signal to produce a down-converted RF signal;

a first amplifier circuit configured to convert the down-converted RF signal to a first baseband signal having a data component, a thermal noise component, and a reciprocal mixing (RM) noise component that is a product of reciprocal mixing of the blocking signal;

a transconductance circuit coupled to the RF node and configured to convert the RF signal to a current signal;

a second passive mixer configured to mix the current signal with the first LO signal to produce a down-converted current signal having a data component near DC, a blocking signal component near a frequency offset Δfb from the data component, and a RM image near a frequency offset 2Δfb from the data component;

thermal noise cancellation circuitry configured to convert the data component of the down-converted current signal to a second baseband signal that approximates the data component and the thermal noise component of the first baseband signal;

phase noise cancellation circuitry configured to mix the blocking signal component and the RM image of the down-converted current signal with a second LO signal to produce a RM noise cancellation signal, the RM noise cancellation signal comprising the RM image down-converted to near DC; and harmonic recombination circuitry configured to combine the first baseband signal, the second baseband signal, and the RM noise cancellation signal to remove at least a portion of the thermal noise component and the RM noise component of the first baseband signal to produce an inbound baseband signal.

18. The RF IC of claim 17, further comprising:

baseband digital processing circuitry configured to process the inbound baseband signal.

19. The RF IC of claim 17, the down-converted RF signal including a down-converted blocking signal component, wherein the second LO signal is derived from the down-converted blocking signal component.

20. The RF IC of claim 19, wherein the second noise cancellation circuitry comprises:

a third passive mixer configured to mix the blocking signal component and the reciprocal mixing image of the down-converted current signal with the second LO signal;

a capacitor coupled on one end to an output of the first passive mixer to pass the down-converted blocking signal component of the down-converted RF signal;

a frequency doubling circuit coupled to a second end of the capacitor, the frequency doubling circuit configured to shift the frequency offset of the down-converted blocking signal from Δfb to 2Δfb to produce a shifted down-converted blocking signal; and an oscillator coupled to the frequency doubling circuit and configured to produce the second LO signal based on the shifted down-converted blocking signal.

* * * * *